June 23, 1936.    J. E. LEVY ET AL    2,044,949
METHOD OF MAKING ANIMAL FIGURES FROM TUFT YARN BALLS
Filed Aug. 12, 1935    2 Sheets-Sheet 1
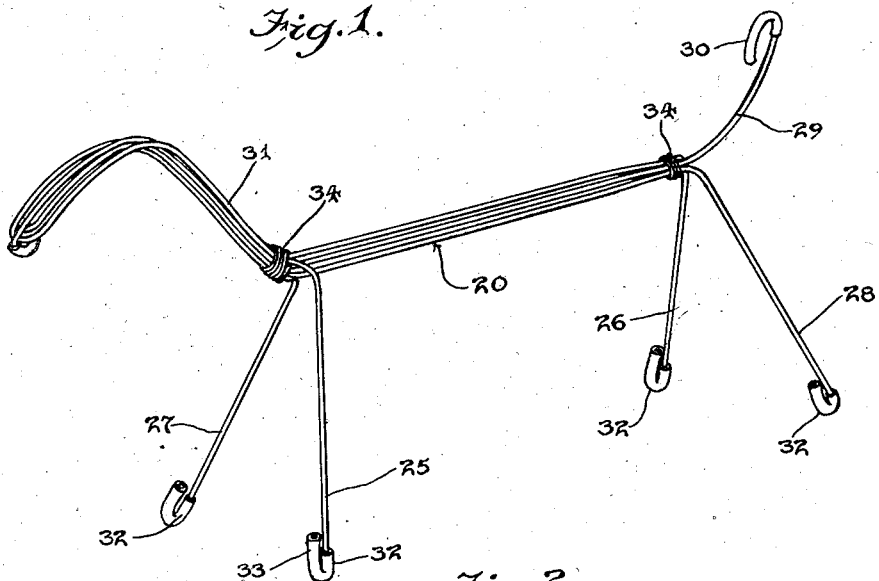
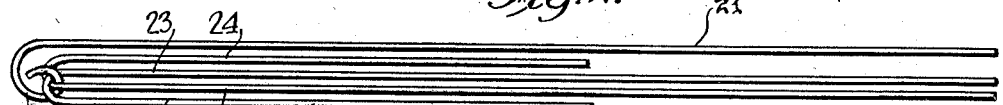
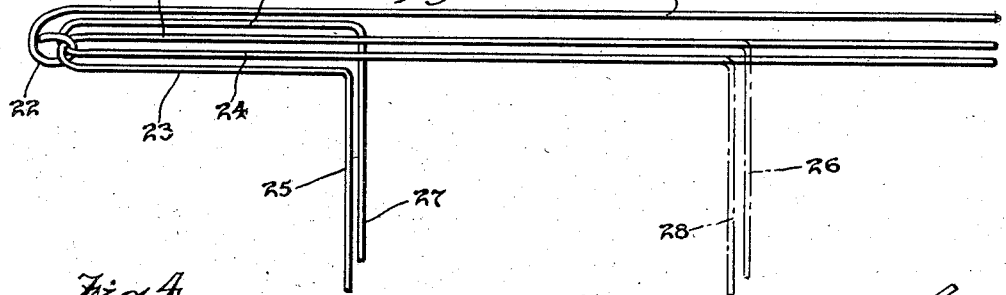
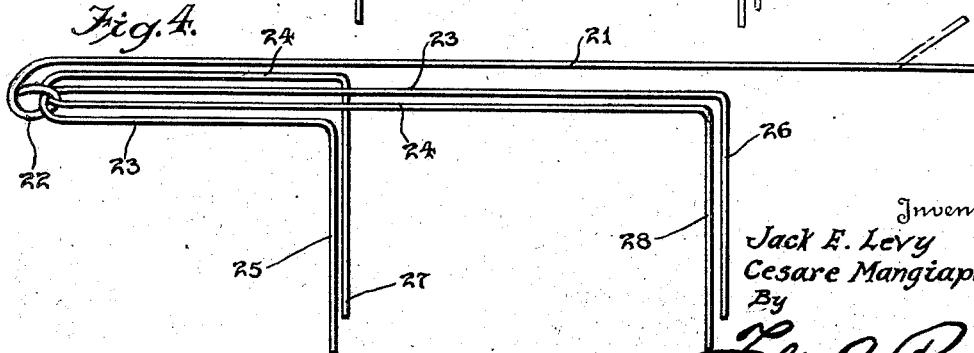
Inventors
Jack E. Levy
Cesare Mangiapani,
By
Felix A. Russell
Attorney June 23, 1936. J. E. LEVY ET AL 2,044,949
METHOD OF MAKING ANIMAL FIGURES FROM TUFT YARN BALLS
Filed Aug. 12, 1935 2 Sheets-Sheet 2
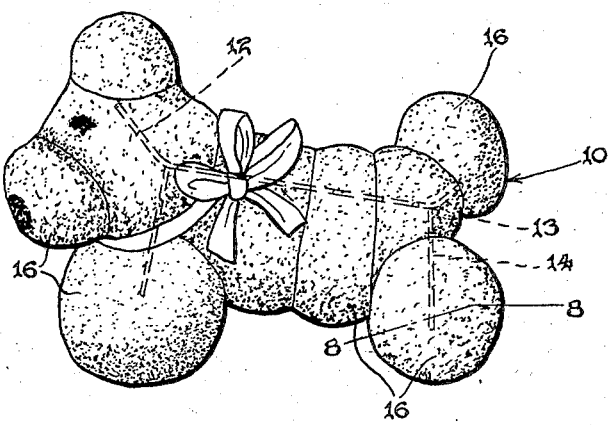
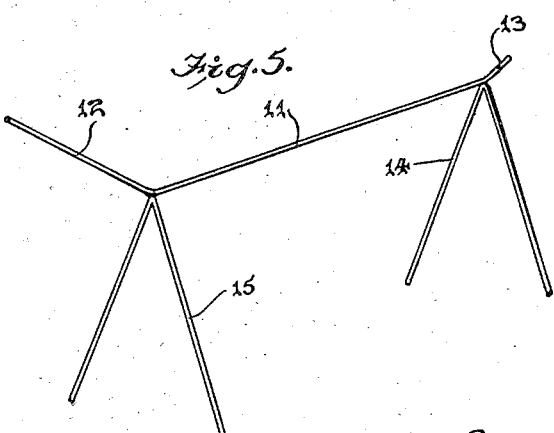
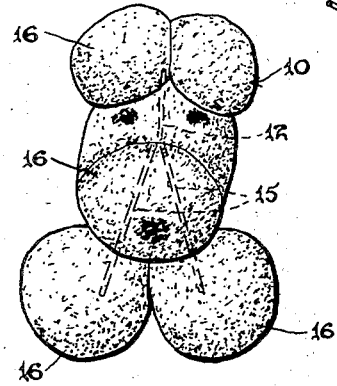
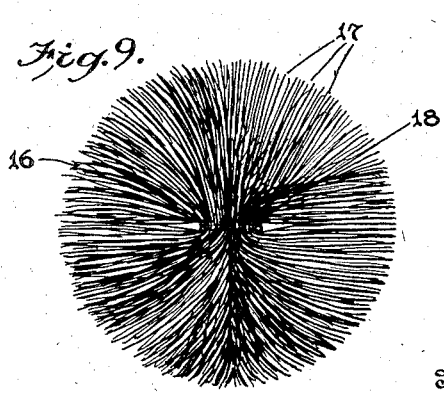
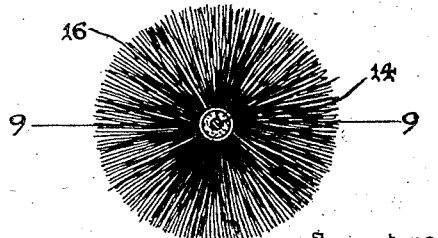
Inventors
Jack E. Levy
Cesare Mangiapani,
By Felix A. Russell
Attorney Patented June 23, 1936

2,044,949

UNITED STATES PATENT OFFICE 2,044,949

METHOD OF MAKING ANIMAL FIGURES FROM TUFT YARN BALLS

Jack E. Levy and Cesare Mangiapani, New York, N. Y.

Application August 12, 1935, Serial No. 35,688

4 Claims. (Cl. 46—151)

This invention relates to a method of making animal figures from tuft yarn balls or "pompoms" and has for its object the simplification and improvement of the construction and operation of methods of this character.

A further object of the invention is the provision of means whereby a series of "pompoms" or tuft yarn balls may be arranged upon a wire framework to form the characterization of an animal such as a dog, cat or the like.

A further object of the invention is the provision of means for forming toy animals with the utmost simplicity and economy.

Other objects and advantages of the invention will be apparent from a reading of the following description, taken in connection with the drawings wherein, for the purpose of illustration, there is shown a preferred embodiment of the invention.

In the drawings:

Figure 1 is a perspective view of a wire framework utilized in the invention,

Figures 2, 3 and 4 illustrate progressive steps in the formation of the framework shown in Fig. 1, Figure 5 is a perspective view of a modification of the invention, Figure 6 is a side elevational view of an animal figure embodying the invention, Figure 7 is a front elevational view of the device as shown in Fig. 6, Figure 8 is an enlarged sectional view taken substantially along line 8—8 of Fig. 6 and Figure 9 is an enlarged sectional view of one of the "pompoms" utilized in this invention.

Referring more particularly to the drawings, there is shown therein a wire framework generally indicated at 20 and being formed of, preferably, three pieces of wire as shown in Figs. 2, 3, and 4. These wires consist, first, of an elongated or backbone piece 21 looped at one end as shown at 22 to engage a pair of U-shaped wires 23 and 24 having sides of unequal length. Each of the wires 23 and 24 is then bent to form one front leg and one rear leg as indicated at 25 and 26, and 27 and 28, respectively. The backbone piece 21 is bent upwardly to form a tail 29 which is curled forwardly as shown at 30.

The forward ends of the wires are then bent in an arcuate forward and downward curve to form the skeleton of the head and neck of the completed animal figure as shown at 31 and the ends of the wires are bent upwardly for a short distance to form feet 32. The loop 22, the curled portion of the tail 30 and the feet 32 are provided with tubular rubber coverings as shown, for example, at 33 in Figure 1. These rubber pieces also serve to hold the tuft yarn balls upon the framework, as will later be described. The framework is held rigidly together by means of bindings of string, thread or the like as shown at 34.

In Figure 5 there is shown a modified form of framework wherein there is provided a centrally located longitudinally extending wire 11 which forms the backbone of the completed animal. A forwardly extended portion 12 is bent to form the framework for the head and a rearwardly extended portion 13 is bent to form the tail of the completed figure. Attached to the wire 11 by any suitable means, as by soldering, is a pair of leg frames 14 and 15.

Upon either of the above described frameworks, in the manner shown in Fig. 8, is strung a series of "pompoms" or tuft yarn balls 16 in such fashion that upon the body portion there may be located several of the "pompoms", while upon the leg frames there may be located but a single "pompom" for each leg. The head of the animal, which is located, of course, upon the forwardly extended portion 12 or 31, will be formed of a large "pompom". The eyes may be formed of selfyarn or of yarn of a contrasting color. This also pertains to the feet and to the tail of the animal figure.

The wire utilized in this invention may be either rigid or flexible and may be bare or covered with rubber or rubber tubing. It will be noted that by reference to Fig. 9, that the "pompoms" consist of a series of strands of yarn as indicated at 17 which are fastened together by means of a single strand of yarn as shown at 18.

While there is shown and described herein a preferred embodiment of the invention, it is to be definitely understood that it is not desired to limit the application of the invention thereto, but any change or changes may be made in the structure or arrangement within the spirit of the invention or the scope of the appended claims.

What is claimed is:

1. The method of forming animal figures comprising the formation of a wire framework consisting of looping a wire at one end, passing a pair of U-shaped wires through the loop and bending the U-shaped wires in such manner that each forms a rear and a front leg and finally stringing tuft yarn balls upon the framework.

2. The method of forming animal figures comprising the formation of a wire framework consisting of looping a wire at one end, forming a pair of U-shaped wires in such manner that each has an elongated leg, passing the U-shaped wires through the loop and bending the U-shaped wires in such manner that each forms a rear and a front leg of the animal figure and finally stringing portions of fibrous material upon the framework so formed.

3. The method of forming animal figures comprising the formation of a wire framework consisting of looping a wire at one end, forming a pair of U-shaped wires in such manner that each has an elongated leg, passing the U-shaped wires through the loop and bending all the wires in such manner that each of the U-shaped wires forms a rear and a front leg of the animal figure while the first mentioned wire forms the tail thereof and the looped end together with the looped portions of the U-shaped wires form the head portion of the figure, bending the lower extremities of the legs of the animal figure upwardly for a short distance to form feet and finally stringing fibrous material upon the framework so formed.

4. The method of forming animal figures comprising the formation of a wire framework consisting of looping a wire at one end, forming a pair of U-shaped wires in such manner that each has an elongated leg, passing the U-shaped wires through the loop and bending all the wires in such manner that each of the U-shaped wires forms a rear and a front leg of the framework while the first mentioned wire forms the tail thereof with its unbent end and at its other end is joined to the loop engaging portions of the remaining wires to form the head portion of the framework, covering the lower extremities of the legs so formed with rubber tubing and bending the same upwardly in such manner that rubber covered feet are formed and finally covering the framework with a fibrous material.

JACK E. LEVY.
CESARE MANGIAPANI.